United States Patent [19]

Riggan

[11] Patent Number: 4,516,028
[45] Date of Patent: May 7, 1985

[54] PULSE FLUX MEASURING DEVICE

[75] Inventor: William C. Riggan, Albuquerque, N. Mex.

[73] Assignee: The United States of America as represented by the United States Department of Energy, Washington, D.C.

[21] Appl. No.: 473,283

[22] Filed: Mar. 8, 1983

[51] Int. Cl.³ .......................... G01T 3/08; G01T 3/02
[52] U.S. Cl. ..................................... 250/370; 250/390
[58] Field of Search ........... 250/370 C, 370 E, 370 R, 250/392, 391, 390, 358.1; 378/157, 156

[56] References Cited

U.S. PATENT DOCUMENTS

| 2,795,703 | 6/1957 | Berlman et al. | 250/392 |
| 2,830,189 | 4/1958 | Scherbatskoy | 250/392 |
| 3,008,045 | 11/1961 | Ruderman | 250/366 |
| 3,201,590 | 8/1965 | Sun | 250/370 E |
| 3,593,025 | 7/1971 | Grosskreutz | 250/358.1 |
| 3,873,840 | 3/1975 | Ellis | 250/392 |
| 3,898,466 | 8/1975 | Kawashima | 250/390 |
| 4,455,669 | 6/1984 | Aichinger et al. | 378/97 |

Primary Examiner—Bruce C. Anderson
Assistant Examiner—Constantine Hannaher
Attorney, Agent, or Firm—George H. Libman; Albert Sopp; Judson R. Hightower

[57] ABSTRACT

A device for measuring particle flux comprises first and second photodiode detectors for receiving flux from a source and first and second outputs for producing first and second signals representing the flux incident to the detectors. The device is capable of reducing the first output signal by a portion of the second output signal, thereby enhancing the accuracy of the device. Devices in accordance with the invention may measure distinct components of flux from a single source or fluxes from several sources.

17 Claims, 4 Drawing Figures

PULSE FLUX MEASURING DEVICE

The U.S. Government has rights in this invention pursuant to Contract No. DE-AC04-76DP00789 between the U.S. Department of Energy and Western Electric Company.

FIELD OF THE INVENTION

This invention relates to devices for simultaneously measuring individual neutron flux from more than one source and devices for simultaneously measuring neutron flux and X-ray radiation.

BACKGROUND OF THE INVENTION

Devices for measuring neutron flux find use in, for example, development of pulsed neutron generators. At times it is necessary to monitor the individual performance of multiple pulsed generators which operate simultaneously. Many neutron sources also produce substantial quantities of X-rays. It is desirable to be able to quantify both the neutron flux and the X-ray radiation in such instances.

Various devices are known for measuring flux from neutron sources. These include ionization chamber-type devices and scintillation-type devices. The ionization chamber-type comprises a volume containing a selected gas and comprising electrodes of selected materials. The scintillation-type device often includes photomultipliers and one or more crystals of selected materials or plastic flours. Each requires judicious selection of gases, metals or crystalline materials and photodetectors in order to produce a device which will measure flux in a satisfactory manner. In the event that either of these types of devices is to be used for measuring both X-rays and neutron flux, complex circuitry is generally required in order to differentiate between and quantify the X-ray radiation and neutron flux, respectively. The relatively complex structure of these devices renders them somewhat difficult and expensive to manufacture. Additionally, none are known to have the ability to discriminate between and simultaneously measure neutron flux from independent sources.

Accordingly, it is an object of the present invention to provide a simple and inexpensive device for measuring neutron flux which may be manufactured using readily available components.

A further object of the invention is to provide a device for measuring both X-rays and neutron flux simultaneously.

An additional object of the invention is to provide a device which is capable of simultaneously measuring outputs of two operating neutron generators.

An additional object is to provide a device for detecting neutron flux which has directional discrimination capability.

The present invention provides a device for detecting neutron flux which is readily calibrated using a simple calibration procedure.

The invention provides such a device which employs photodiode detector means.

SUMMARY OF THE INVENTION

A neutron flux detector in accordance with the invention comprises radiation sensors and a dual channel analog processing circuit. Particularly, a device in accordance with the invention comprises at least first and second photodiode detector means for receiving flux from a source, first and second output means for producing first and second output signals representative of the flux incident to the respective detectors, and means for reducing the first output signal by a magnitude equivalent to a portion of the second output signal.

The means for reducing the first signal comprises a resistance connected between the second output and an output portion of the first detector. Preferably, the resistance is variable for facilitating calibration.

A shield is interposed between the first and second detectors for shielding the second detector from a portion of the flux incident to the first detector. Preferably, a proton radiator is associated with at least the second detector.

The device may be adapted to be exposed to flux from at least two sources. In such event, the device comprises further means for reducing the second output signal by a magnitude equivalent to a portion of the first output signal. The means for reducing the second output signal comprises a resistance connected between the first output means and an output portion of the second detector. A shield positioned between the first and second detectors shields the first detector from a portion of the proton flux incident to the second detector and shields the second detector from a portion of the proton flux incident to the first detector. A proton radiator is associated with each detector means.

BRIEF DESCRIPTION OF THE DRAWINGS

The present invenion will be best understood in light of the detailed description hereinbelow taken together with the accompanying drawings, in which.

DETAILED DESCRIPTION OF THE PREFERRED EMBODIMENTS

Figure 1:
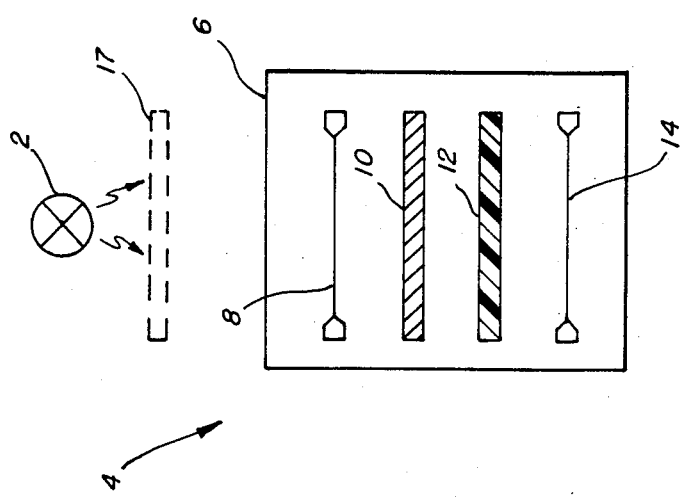
FIG. 1 illustrates a first embodiment of a pulse detecting device in accordance with the present invention.

A neutron generator 2 is schematically illustrated in FIG. 1. In addition to neutron flux, generator 2 may also produce X-rays. A detector 4 in accordance with the present invention comprises a light shield 6 at least partially shrouding the remaining elements of the device. Detector 4 further includes a first silicon photodiode 8, a lead shield 10, a proton radiator 12, and a second silicon photodiode 14 arranged in sequence. Proton radiator 12 may be formed from polyethylene. Reference numeral 17 indicates a lead shield which may be selectively interposed between generator 2 and detector 4 for a purpose to be described in greater detail hereinafter.

Figure 2:
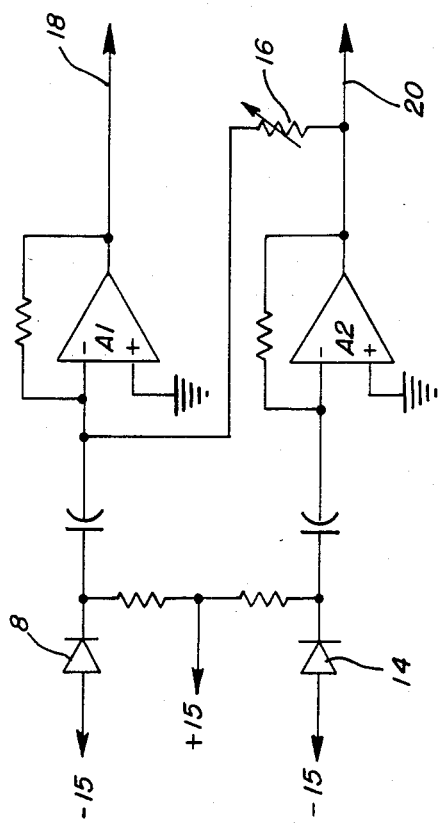
FIG. 2 schematically illustrates an output circuit associated with the device of FIG. 1.

The device illustrated in FIG. 1 is capable of discriminating between and simultaneously measuring X-rays and neutron flux. When neutron generator 2 is operated, a pulse of X-rays and neutrons are simultaneously incident upon detector 4. Both the neutrons and the X-rays are incident to and interact with photodiode detector 8, producing an electrical charge. This charge pulse is swept out of photodiode 8 by a reverse bias voltage, as shown in FIG. 2. The charge is amplified by amplifier A1. The output of A1 at this time is a voltage-analog signal representing the combined X-ray pulse and neutron pulse incident upon detector 4.

The neutrons and X-rays continue in a downward direction, as illustrated in FIG. 1. Lead shield 10 blocks the X-rays but allows most of the neutrons to pass.

A substantial number of the neutrons passing shield 10 are incident to polyethylene proton radiator 12 and undergo elastic scattering with hydrogen atoms in the polyethylene. The radiator therefore emits protons which are ejected into second photodiode 14. Photodiode 14 is also bombarded by neutron flux.

As a result of the proton and neutron bombardment, photodiode 14 produces a charge which is then amplified by amplifier A2. The output of A2 is therefore a voltage-analog signal representative of the neutron pulse passing shield 10 since no X-rays reach second photodiode 14.

It is possible to eliminate proton radiator 12, permitting the neutron flux to simply bombard photodiode 14 of the detector. However, neutron bombardment of radiator 12 causes the radiator to emit protons which outnumber the incident neutrons by a factor of about 2. Therefore, there are more interactions with the photodiode and the sensitivity of the device is enhanced.

In order to obtain output representative of only the X-rays emitted by generator 2, a calibrated fraction of the signal emitted from amplifier A2 is fed back to the input of amplifier A1 (at the output of photodiode 8). The portion of the signal from amplifier A2 which is fed back to amplifier A1 is regulated by resistance 16 which is preferably a variable resistor. Because the signal from amplifier A2 is of opposite polarity to the combined X-ray and neutron signal from photodiode 8, it is subtracted from the combined signal. The output of amplifier A1 thereby represents only the X-rays incident to the detector.

Adjustment of resistor 16 for proper cancellation of the neutron portion of the signal from photodiode 8 is easily accomplished. A lead shield 17 is inserted between neutron generator 2 and detector 4, as shown in phantom lines in FIG. 1. Generator 2 is operated but, due to the presence of shield 17, only neutron flux is permitted to reach photodiodes 8 and 14. Variable resistor 16 is adjusted so that the output of amplifier A1 is as close to zero volts as possible, thus removing the neutron signal contribution from the output of photodiode 8. Upon subsequent exposure to combined X-rays and neutron flux, detector 4 will provide a measure of X-rays only via output 18 and a measure of neutron flux only via output 20, as shown in FIG. 2.

Figure 3:
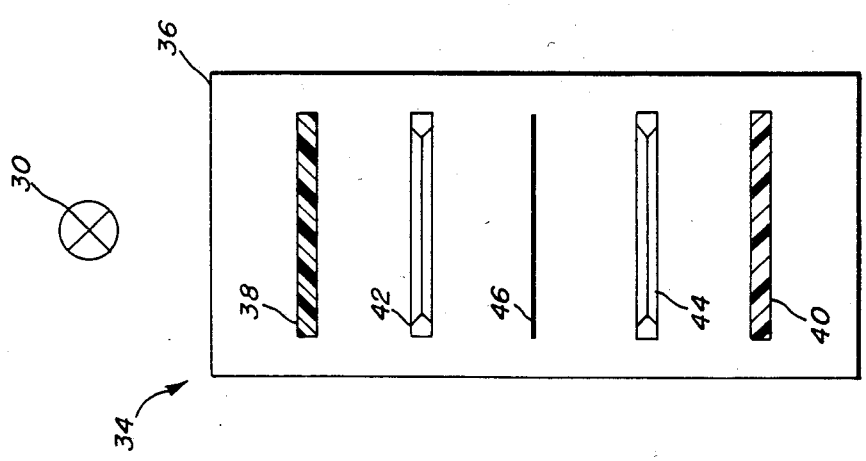
FIG. 3 illustrates a second embodiment of a pulse detection device in accordance with the invention.

FIG. 3 illustrates another embodiment of a detector in accordance with the present invention. The embodiment shown in FIG. 3 is a dual channel device which is capable of providing simultaneous measurement of neutron flux from independent sources. The device is capable of directionally discriminating between sources positioned at various locations with respect thereto.

In FIG. 3, separate neutron pulse generators 30 and 32 are located in opposite directions with respect to a detector 34 in accordance with the invention. Detector 34 is a dual channel embodiment of the present invention comprising light shield 36, a first polyethylene proton radiator 38, a second portion radiator 40, a first silicon photodiode 42, a second silicon photodiode 44, and a copper shield 46. Operation of this embodiment will be described with joint reference to FIGS. 3 and 4.

Considering a situation in which only neutron generator 30 is operating, the neutron pulse generated will be incident upon polyethylene proton radiator 38. These neutrons will suffer elastic scattering with the hydrogen atoms in the polyethylene and protons will be ejected into the photodiode 42. As a result of bombardment by the protons and of direct neutron interaction, photodiode 42 produces a pulsed electrical charge. This charge, which is an analog representation of the incident neutron pulse produced by generator 30, is swept out of the photodiode by an applied reverse bias voltage and amplified by amplifier A3.

Protons passing beyond photodiode 42 are blocked by copper shield 46, while neutrons continue past shield 46 and are incident to second photodiode 44. Thus, charge is generated by photodiode 44 as a result of direct neutron interaction only. The charge pulse produced by photodiode 44 is swept out by a reverse bias voltage and amplified by amplifier A4.

Since the photodiode signal generated by proton interaction is typically twice the magnitude of the signal resulting from direct neutron interaction, the photodiode signals will generally differ by a factor of approximately three. That is, with only neutron generator 30 operating, the signal from photodiode 42 will be approximately three times the signal from photodiode 44. If neutron generator 32 is operated, the output from photodiode 44 will be approximately three times that of photodiode 42.

The signal-cancelling or compensation circuit is easily calibrated by operating one generator and adjusting the corresponding feedback resistor for minimum signal output from the opposite channel. For example, when neutron generator 30 is operated, a first variable resistor 50 is adjusted so that the signal at the second output 54 is zero volts. Likewise, when neutron generator 32 is operated, a second variable resistor 48 is adjusted so that the output at a first output 52 is substantially zero.

When both generators 30 and 32 are operated simultaneously, the signals produced by photodiodes 42 and 44 are amplified by amplifiers A3 and A4, respectively. Calibrated portions of the outputs of amplifiers A3 and A4 are fed back via resistors 50 and 48, respectively, to the opposite channels, thus reducing the magnitude of each of the signals. This results in output of analog signals at 52 and 54 which represent the neutron pulses from generators 30 and 32, respectively.

Figure 4:
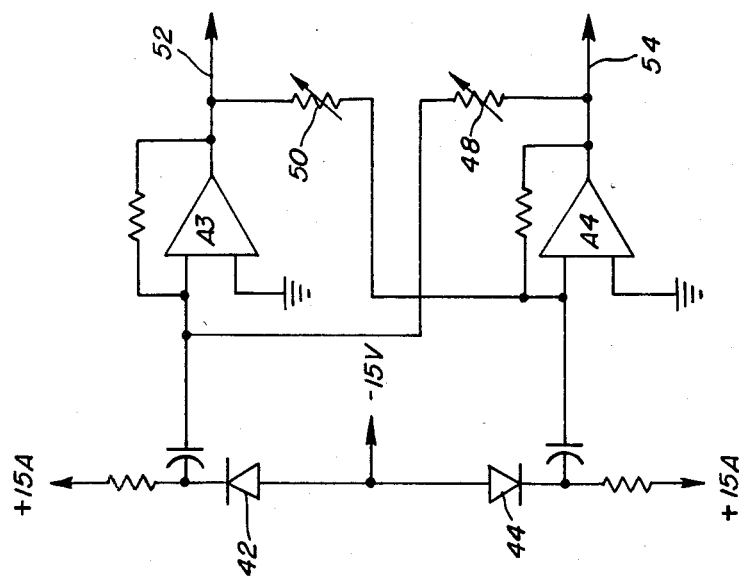
FIG. 4 schematically illustrates an output circuit associated with the device of FIG. 3.

Detectors as shown and described with respect to FIGS. 3 and 4 have proven to have remarkable directional discriminating capability. They are capable of reliably measuring the outputs of two neutron generators simultaneously. Detectors in accordance with the invention have an effective channel-to-channel isolation of more than 10:1. That is, the effects of one neutron generator on the output of the other channel is much less than ten percent of the output resulting from the neutron generator associated with the other channel.

Test meaurements were made using an embodiment of the present invention as shown in FIGS. 1 and 2. A neutron generator which also generates X-rays was appropriately positioned, as illustrated in FIG. 1. The generator emitted a uniform pulse in each instance.

With the signal compensation or subtraction circuit non-operational (resistor 16 deleted from the circuit of FIG. 2) the signals at output 18 representing the X-rays and at output 20 representing neutron flux were both 1.66 volts. The signal compensation or feedback resistor 16 was then made operational and the circuit calibrated, using lead shield 17, in the manner described above. With shield 17 in place, resistor 16 ws adjusted until the output at 18 was −0.13 volts and the neutron-only signal at 20 was 1.54 volts. After calibration, shield 17 was removed and measurements taken of yet another pulse. Output at 18 representing X-rays was 1.12 volts, while output at 20 representing neutron flux was 1.57 volts. This demonstrates that the neutron signal contribution to the X-ray signal can be successfully removed, yielding a pure measurement of both X-rays and neutron flux using an embodiment of the invention as shown in FIG. 1.

Similar tests were conducted using two neutron generators and an embodiment of the invention as shown in FIG. 3. Generator outputs were likewise similar for all test measurements.

With only generator 30 operational, output at 52, resulting from photodiode 42 closest to generator 30, was 2.56 volts. Output at 54 was 1.15 volts. The signal produced by neutrons reaching photodiode 44 is an unnecessary contribution to the signal resulting from photodiode 42 and must be subtracted to obtain an accurate signal at output 52. This was accomplished by proper adjustment of feedback resistor 48 in the manner described above. After adjustment, the signal at output 52 was 2.37 volts, the signal at output 54 being reduced to 0.32 volts. Calibration of the opposite channel may be accomplished in the same manner when only generator 32 is operational.

With both generators 30 and 32 operational but with feedback resistors 48 and 50 non-operational, the signals at both outputs 52 and 54 were 3.5 volts. With both resistors 48 and 50 operational and properly calibrated, the output at 52 was 2.7 volts, while the output at 54 was 2.6 volts. Thus, a significant reduction in signal crosstalk is achieved using a device in accordance with the present invention which is capable of individually measuring outputs from two simultaneously operated neutron generators.

The embodiment of FIG. 1 is particularly adapted to measure both X-rays and neutron flux from a single source, while the embodiment of FIG. 3 is adapted to measure neutron flux from a plurality of sources. However, the features of each embodiment are not mutually exclusive. It is possible, of course, that the embodiment of FIG. 3 could be modified by addition of a photodiode detector 8 and a lead shield 10 (FIG. 1) in front of each proton radiator 38 and 40 of the FIG. 3 device. With such modification, the device of FIG. 3 would be capable of measuring both X-rays and neutron flux from each generator. It is additionally possible that a device in accordance with the present invention may comprise means for simultaneously measuring outputs from more than two generators, employing the principles discussed with respect to FIGS. 3-4. The directional neutron detectors may be packaged separately and cross coupled to obtain subtraction.

The invention being thus described, it will be apparent that certain modifications to the invention might be made by those of ordinary skill in the art. For example, a plurality of elements in accordance with the invention may be stacked to increase the sensitivity of the device. Such modifications are considered to be within the scope of the present invention, which is limited only by the claims appended hereto.

I claim:

1. A device for measuring particle flux comprising:
   first and second sequentially arranged photodiode detector means for receiving flux from a source;
   shield means, interposed between said first and second photodiode detector means, for shielding said second detector means from a portion of the flux received by said first detector means;
   first and second output means for producing first and second output signals representative of the flux incident to said first and second photodiode detector means, respectively; and
   compensation means for reducing said first output signal by a magnitude equivalent to a portion of said second output signal.

2. A device as in claim 1, wherein said first and second photodiode detector means receive flux from at least two sources;
   further comprising second compensation means for reducing said second output signal by a magnitude equivalent to a portion of said first output signal.

3. A device as in claim 1, wherein said compensation means comprises a resistance means connected between said second output means and an output portion of said first photodiode detector means.

4. A device as in claim 2, wherein said compensation means comprises a first resistance means connected between said second output means and an output portion of said first photodiode detector means; and
   said second compensation means comprises a second resistance means connected between said first output means and an output portion of said second photodiode detector means.

5. A device as in claim 3, wherein said resistance means is a variable resistance.

6. A device as in claim 4, wherein said first and second resistance means each comprise a variable resistance.

7. A device as in claim 1, wherein said first and second detector means receive flux from at least two sources, said shield means further shielding said first detector means from a portion of the flux incident to said second detector means.

8. A device as in claim 1, further comprising a proton radiator associated with at least said second detector means.

9. A device as in claim 8, further comprising a proton radiator associated with said first detector means.

10. A device for measuring both X-ray and neutron flux produced by a source comprising:
    first photodiode detector means for producing an electrical charge representative of received flux from the source;
    first output means, connected to said first detector means, for producing a first signal representative of the charge from said first detector means, said signal being representative of the X-ray and neutron flux from said source;
    shield means for blocking X-rays in the flux;
    proton radiator means for emitting protons when struck by neutrons, said radiator means being positioned at a side of said shield opposite the source;
    second photodiode detector means for producing an electrical charge representative of received flux, said second detector means being positioned at a side of said proton radiator opposite from said shield;
    second output means, connected to said second detector means, for producing a second signal representative of the flux reaching said second detector means; and compensation means for reducing said first signal by a magnitude equivalent to a portion of said second signal, whereby said reduced first signal is representative of the X-ray flux of the source.

11. A device as in claim 10, wherein said compensation means comprises resistance means connected between said second output means and an output portion of said first photodiode detector means.

12. A device as in claim 11, wherein said resistance means comprises a variable resistor.

13. A device as in claim 10 wherein said proton radiator means is formed of polyethylene.

14. A device for measuring neutron flux from at least two sources, comprising:

first and second proton radiator means facing in respectively different directions to receive flux from first and second sources, respectively, and for radiating protons in response to said flux;

first and second photodiode detector means associated with said first and second proton radiator means for receiving flux from the first and second sources and protons from said first and second radiator means, respectively;

first and second output means for producing first and second signals representative of the proton and neutron flux incident to said first and second detector means, respectively;

shield means for preventing passage of protons from said first radiator means to said second detector means and from said second radiator means to said first detector means;

first compensation means for reducing said first signal by a magnitude equivalent to a portion of said second signal; and second compensation means for reducing said second signal by a magnitude equivalent to a portion of said first signal.

15. A device as in claim 14, wherein:

said first compensation means comprises a first resistance means connected between said second output means and an output portion of said first detector means; and said second compensation means comprises a second resistance means connected between said first output means and an output portion of said second detector means.

16. A device as in claim 15, wherein said first and second resistance means each comprises a variable resistor.

17. A device as in claim 14 wherein said shield means is a copper shield located between said first and second photodetector means.

* * * * *